United States Patent
Yan et al.

(10) Patent No.: US 9,684,561 B1
(45) Date of Patent: Jun. 20, 2017

(54) SMART ASSISTANT FOR BACKING UP DATA

(71) Applicant: EMC Corporation, Hopkinton, MA (US)

(72) Inventors: Meng Yan, Stoney Creek (CA); Vijuna Benedict, Brampton (CA); Rajesh Ramsoondar, Brampton (CA); Michael Kaufman, Guelph (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 14/500,872

(22) Filed: Sep. 29, 2014

(51) Int. Cl.
*G06F 7/00* (2006.01)
*G06F 17/00* (2006.01)
*G06F 11/14* (2006.01)
*G06F 17/30* (2006.01)

(52) U.S. Cl.
CPC .... *G06F 11/1412* (2013.01); *G06F 17/30575* (2013.01)

(58) Field of Classification Search
CPC ............ G06F 11/1451; G06F 11/1458; G06F 11/1464; G06F 11/1448; G06F 11/1461
USPC ......................................................... 707/654
See application file for complete search history.

(56) References Cited

U.S. PATENT DOCUMENTS

| | | | |
|---|---|---|---|
| 8,533,818 B1 * | 9/2013 | Ketterhagen | G06F 21/567 726/22 |
| 2003/0050940 A1 * | 3/2003 | Robinson | G06F 11/1456 |
| 2004/0107199 A1 * | 6/2004 | Dalrymple, III | G06F 11/1451 |
| 2005/0010609 A1 * | 1/2005 | Katoh | G06F 21/6218 |
| 2012/0016843 A1 * | 1/2012 | Borden | G06F 17/30097 707/654 |
| 2012/0210398 A1 * | 8/2012 | Triantafillos | G06F 11/1458 726/4 |
| 2013/0238768 A1 * | 9/2013 | Vaidya | H04L 67/14 709/220 |
| 2013/0238889 A1 * | 9/2013 | Fernandez | G06Q 10/30 713/100 |
| 2013/0239192 A1 * | 9/2013 | Linga | G06F 21/44 726/7 |
| 2014/0040580 A1 * | 2/2014 | Kripalani | G06F 3/065 711/162 |
| 2014/0201144 A1 * | 7/2014 | Vibhor | H04L 29/0854 707/634 |

* cited by examiner

*Primary Examiner* — Hosain Alam
*Assistant Examiner* — Nicholas Allen
(74) *Attorney, Agent, or Firm* — Staniford Tomita LLP

(57) ABSTRACT

A smart assistant scans or directs the scanning of a network and clients connected to the network to ensure that the clients will be properly backed up. When the smart assistant detects a change in the network, a client, or both, the smart assistant seeks the approval of a backup administrator to automatically update backup configuration information based on the detected change. If the backup administrator approves the approval request, the smart assistant automatically updates the backup configuration information. If the backup administrator denies the approval request, the smart assistant does not update the backup configuration information.

20 Claims, 20 Drawing Sheets

| Source | Destination | Parameters |
|---|---|---|
| sourceIP1\sourcePath1\ | destinationIP1\destinationPath1\ | Parameter 1, Parameter 2 ... |
| ... | ... | ... |
| sourceIPn\sourcePathn\ | destinationIP1\destinationPathn\ | Parameter N ... Parameter M |

Figure 5

| Source | Destination | Parameters |
|---|---|---|
| sourceIP1\sourcePath1\ | destinationIP1\destinationPath1\ | Parameter 1, Parameter 2 . . . |
| sourceIPx\sourcePathy\ | destinationIP1\destinationPathk\ | Parameter P, Parameter Q . . . |
| . . . | . . . | . . . |
| sourceIPn\sourcePathn\ | destinationIP1\destinationPathn\ | Parameter N . . . Parameter M |

First Scan: ← 1105

```
-bash-4.1# df -k
Filesystem         1K-blocks     Used Available Use% Mounted on
/dev/mapper/vgroot-lvroot
                   20158332   8087096  11047236  43% /
tmpfs               1963152        88   1963064   1% /dev/shm
/dev/sda1            198337     93942     94155  50% /boot
/dev/mapper/vgroot-lvspace
                   37531176  34726580    898116  98% /space
ladon.legato.com:/users/home/oratest
                  195939552 177216704  16763456  92% /emc/oratest
bu-monroe.iss.emc.com:/volume1/dbtools/oracle/redhat/x86_64/product/11.2.0.1.0/db_1
                 7743056384 976329600 6766624384  13% /bigspace/oracle/redhat/64bit/product/11.2.0.1.0/db_1
```

Smart Assistant Scan Parameters: ← 1110

Parameter: Disk Partitions

- /dev/shm
- /boot

Figure 11

Subsequent Scan: ← 1205

```
-bash-4.1# df -k
Filesystem         1K-blocks     Used Available Use% Mounted on
/dev/mapper/vgroot-lvroot
                   20158332   8087096  11047236  43% /
tmpfs               1963152        88   1963064   1% /dev/shm
/dev/sda1            198337     93942     94155  50% /boot   ← 1215
/dev/sda2            198334     93932     94255  60% /DB2
/dev/mapper/vgroot-lvspace
                   37531176  34726580    898116  98% /space
ladon.legato.com:/users/home/oratest
                  195939552 177216704  16763456  92% /emc/oratest
bu-monroe.iss.emc.com:/volume1/dbtools/oracle/redhat/x86_64/product/11.2.0.1.0/db_1
                 7743056384 976329600 6766624384  13% /bigspace/oracle/redhat/64bit/product/11.2.0.1.0/db_1
```

Smart Assistant Scan Parameters: ← 1210

Parameter: Disk Partitions

- /dev/shm
- /boot
- /DB2 ← 1215

Figure 12

1305 → Previous Scan:
1310 → Database Parameters: NULL

Figure 13

Previous Scan: ← 1405

Smart Assistant Detects: ← 1410

Databases name = Production

Database instance = Instance_01

Database installation path = /DB2/9.7/bin

Database version = 9.7

Database data location = /Symmetrix/Lun10/Instance_01

Database content – number of datafiles =<x>/tablespaces=<y>

← 1415
Database Parameters:

Databases name = Production

Database instance = Instance_01

Database installation path = /DB2/9.7/bin

Database version = 9.7

Database data location = /Symmetrix/Lun10/Instance_01

Database content – number of datafiles =<x>/tablespaces=<y>

Figure 14

Previous Scan: ← 1505

Smart Assistant Detects:
    Databases name = Production
    Database instance = Instance_01
    Database installation path = /DB2/9.7/bin
    Database version = 9.7
    Database data location = /Symmetrix/Lun10/Instance_01
    Database content – number of datafiles =<x>/tablespaces=<y>

Database Parameters: ← 1507
    Databases name = Production
    Database instance = Instance_01
    Database installation path = /DB2/9.7/bin ← 1510
    Database version = 9.7 ← 1515
    Database data location = /Symmetrix/Lun10/Instance_01 ← 1520
Database content – number of datafiles =<x>/tablespaces=<y>

Figure 15

Subsequent Scan: ← 1605

Smart Assistant Detects:
    Databases name = Production
    Database instance = Instance_01 ← 1610
    Database installation path = /DB2/10.1/bin
    Database version = 10.1 ← 1615
    Database data location = /Symmetrix/Lun11/Instance_01 ← 1620
    Database content – number of datafiles =<x>/tablespaces=<y>

Database Parameters: ← 1607
    Databases name = Production
    Database instance = Instance_01 ← 1625
    Database installation path = /DB2/10.1/bin
    Database version = 10.1
    Database data location = /Symmetrix/Lun11/Instance_01
Database content – number of datafiles =<x>/tablespaces=<y>

Figure 16

```
Rpm –qa | grep –l emcddbda
    o  emcddbda-2.0.0.0.0-1.x86_64
```
Figure 17 ← 1705

1805 → Previous Scan:

1810 → DDBoost Parameter:

Package Name = NULL

Version = NULL

Subsequent Scan:

Detects package name -> emcddbda-2.0.0.0.0-1.x86_64 ← 1915

1910 → DDBoost Parameter:

Package Name = emcddbda-2.0.0.0.0-1.x86_64

Version = 2.0.0.0

```
nsrrpcinfo –p <hostIP>
```
2010 →   o  Get a list of registered programs and their program numbers
    -bash-4.1# nsrrpcinfo -p bu-jazz.lss.emc.com program vers proto   port 100000  2   tcp   7938  nsrportmapper 100000  2   udp   7938  nsrportmapper 390436  1   tcp   9088  nsrexecd 390435  1   tcp   9549  nsrexecd 390113  1   tcp   7937  nsrexecd 390103  2   tcp   8775  nsrd 390109  2   tcp   8775  nsrstat

```
rpcinfo -n 7937 -t bu-jazz.lss.emc.com 390113
```
2110 →   *  program 390113 version 1 ready and waiting

Figure 21

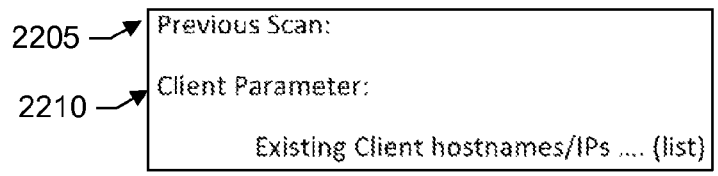
Figure 22
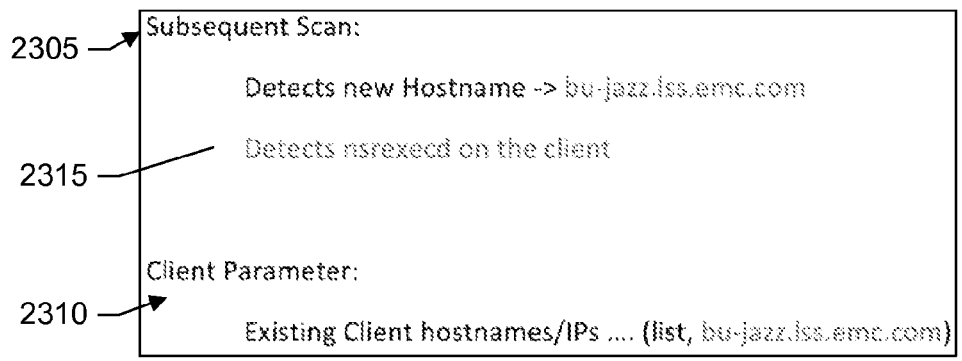
Figure 23
```
nsrrpcinfo –p <hostIP>
    o  Get a list of registered programs and their program numbers
       -bash-4.1# nsrrpcinfo -p bu-jazz.lss.emc.com
    program vers proto   port
    100000    2   tcp    7938  nsrportmapper
    100000    2   udp    7938  nsrportmapper
    390436    1   tcp    9088  nsrexecd
    390435    1   tcp    9549  nsrexecd
    390113    1   tcp    7937  nsrexecd
    390103    2   tcp    8775  nsrd
    390109    2   tcp    8775  nsrstat
    390110    1   tcp    8775  nsrjb
    390120    1   tcp    8775
    390109    2   udp    8301  nsrstat
```
Figure 24
```
rpcinfo -n 7937 -t bu-jazz.lss.emc.com 390113
    *    program 390113 version 1 NOT ready
```
Figure 25

Client Parameters:

Existing Client hostnames/IPs .... (list)  <- bu-jazz is removed from the list.

Figure 31

```
-bash-4.1# ifconfig eth0    Link encap:Ethernet  HWaddr 00:50:56:9E:00:52 inet addr:10.5.162.103  Bcast:10.255.255.255  Mask:255.255.254.0 inet6 addr: 2620:0:170:531:250:56ff:fe9e:52/64 Scope:Global inet6 addr: fe80::250:56ff:fe9e:52/64 Scope:Link UP BROADCAST RUNNING MULTICAST  MTU:1500  Metric:1

RX packets:169756778 errors:0 dropped:0 overruns:0 frame:0

TX packets:20610125 errors:0 dropped:0 overruns:0 carrier:0 collisions:0 txqueuelen:1000

RX bytes:30450369711 (28.3 GiB)  TX bytes:12782388405 (11.9 GiB)

lo      Link encap:Local Loopback inet addr:127.0.0.1  Mask:255.0.0.0 inet6 addr: ::1/128 Scope:Host

UP LOOPBACK RUNNING  MTU:16436  Metric:1

RX packets:15181537 errors:0 dropped:0 overruns:0 frame:0

TX packets:15181537 errors:0 dropped:0 overruns:0 carrier:0 collisions:0 txqueuelen:0

RX bytes:4321563011 (4.0 GiB)  TX bytes:4321563011 (4.0 GiB)
```

Figure 32

```
# lspci | grep "Fibre Channel"
07:00.0 Fibre Channel: QLogic Corp. ISP2532-based 8Gb Fibre Channel to PCI Express
HBA (rev 02)
0a:00.0 Fibre Channel: QLogic Corp. ISP2532-based 8Gb Fibre Channel to PCI Express
HBA (rev 02)

Class Device = "host3"
Class Device path = "/sys/class/fc_host/host3"
  fabric_name       = "0x50014380272531e9"
  issue_lip         = <store method only>
  node_name         = "0x50014380281412e9"
  port_id           = "0x0000e8"
  port_name         = "0x50014380281412e8"
  port_state        = "Online"
  port_type         = "LPort (private loop)"
  speed             = "8 Gbit"
  supported_classes = "Class 3"
  supported_speeds  = "1 Gbit, 2 Gbit, 4 Gbit, 8 Gbit"
  symbolic_name     = "HPAK344A FW:v5.06.03 DVR:v8.03.07.09.05.08-k"
  system_hostname   = ""
  tgtid_bind_type   = "wwpn (World Wide Port Name)"
  uevent            = <store method only>

Device = "host3"
    Device path = "/sys/devices/pci0000:00/0000:00:01.0/0000:07:00.0/host3"
```

Figure 33

```
NSR Res info:
        type: NSR client;
        name: bu-dragon.lss.emc.com;
        server: bu-dragon.lss.emc.com;
    client id: 76b6fe00-00000004-53ece0eb-53ece0ea-00015000-52009e56;
    scheduled backup: [Enabled]  Disabled ;
        comment: ;
 Save operations: ;
 archive services: Enabled  [Disabled];
        schedule: Default  Forever Incremental  Full Every Day  Full Every Friday  Full on 1st Friday of Month
            Full on 1st of Month  Quarterly  Synthetic Full 1st Friday of Month  Synthetic Full Every Friday
            Synthetic Full Quarterly  Synthetic Full on 1st of Month ;
    browse policy: ;
    retention policy: Day  Decade  Month  Quarter  Week  Year ;
        statistics: elapsed = 690566, index size (KB) = 0, amount used (KB) = 0, entries = 0;
    index message: "Cross check completed successfully index operation start: ;
        index progress: ;
     index operation: [Idle]  Reclaiming space  Cross-checking  Purging the oldest cycle ;
        index save set: ;
            directive: Default  Default with compression  Encryption directive  Mac OS standard directives
                Mac OS with compression directives  NT standard directives  NT with compression directives
                NetWare standard directives  NetWare with compression directives  Unix standard directives
                Unix with compression directives  VCB directive ;
        group: ;
    pre policy group: ((group list defined));
        selection list: backup-cluster  backup-cluster-sel ;
        save set: All;
        save set MBT. ;
```

Figure 34

```
NSR Peer Information:

On the server side client (bu-dragon): for remote Jazz client

Command: Select  Next  [Prev]  Edit  Create  Delete  Options  Quit 4 of 8 (on bu-dragon.lss.emc.com)

type: NSR peer information;

administrator: root, "user=root,host=bu-dragon.lss.emc.com";

name: bu-jazz.lss.emc.com;

NW instance ID: 008bd552-00000004-9b2ff5a5-53e24da3-000130bc-3ee6625b;

peer hostname: bu-jazz.lss.emc.com;

Change certificate: Load certificate from file   Clear certificate ;

certificate file to load: ;

certificate: \
"-----BEGIN CERTIFICATE-----

MIIB9DCCAV2gAwIBAQIBADANBgkqhkiG9w0BAQUFADBAMT4wPAYDVQQDEzUwMDhi

ZDU1MiOwMDAwMDAwNC05YjJmZjVhNS01M2UyNGRhMy0wMDAxMzBiYy0zZWU2Nj11

YjAeFw03MTAxMDEwMDAwMDBaFw0zODAxMTgwMzE0MDdaMEAxPjA8BgNV8AMTNTAw

OGJkNTUyLTAwMDAwMDA0LTliMmZmNWE1LTUzZTI0ZGEzLTAwMDEzMGJjLTNlZTY2

MjViMIGfMA0GCSqGSIb3DQEBAQUAA4GNADCBiQKBgQCvm7zIGoLHrfdgBXj071Bb hIIXbQAgWFAMzbY0pENk495SICxETDSD5/OowioIwpgRXRci0I3Xdm4303M0XTYF wGjEHKjNmtZPi85oRUOyawfW+Z4xAqaCu9rqYXA6V6zX/KUiEa4xwPeHMNWjoBsD KctP7CaLBM1wYn/PozjHoQIDAQABMA0GCSqGSIb3DQEBBQUAA4GBAGXurx2ygdZK ZOMf5QSnTiIdBIS5gM7LavUZN6uhAvCkeY9TQODu4yI5IIsWw/fMJW9mTrayL5dq 0LNvy/UQogiM74UwuU9654YLbFyzKze5DhkT6r8NJLFCm8doyB/CLzejF+DYLeX 1e700CHjYW6RVMOpdusjMIgtspPCDH1I

-----END CERTIFICATE-----";
```

Figure 35

SMART ASSISTANT FOR BACKING UP DATA

TECHNICAL FIELD

The present invention relates generally to the field of information technology, and, more particularly, to systems and techniques for data backup.

BACKGROUND

Backing up data is important for a number of reasons. Backing up data helps organizations to recover from disasters, security breaches, accidental data loss, and so forth. A large enterprise may include hundreds or even thousands of clients to backup. The process of configuring, maintaining, and updating backup configurations in such a large backup system is very laborious and time-consuming.

For example, there can be changes to the clients, the network, or both that happen on a weekly or even a daily-basis. Communicating these changes to the backup administrator is often haphazard. Further, even in cases where such changes are communicated to the backup administrator, the sheer number of changes to account for presents a very daunting task. The result is that in many cases these changes are not incorporated into the next backup or the changes are not properly propagated throughout the backup system. This leads to instances of data not being backed up and problems with recovery.

Thus, there is a need to provide systems and techniques for automating the discovery of changes and the process of updating the backup configuration information based on those changes.

BRIEF DESCRIPTION OF THE FIGURES

FIG. 5 shows an example of a table storing backup configuration information in a specific embodiment.

FIG. 11 shows an example of information and associated parameters from a first scan for discovering disk partitions in a specific embodiment.

FIG. 12 shows an example of information and associated parameters from a second scan after the first scan of FIG. 11 in a specific embodiment.

FIG. 13 shows an example of information and associated parameters from a first scan for discovering a database in a specific embodiment.

FIG. 14 shows an example of information and associated parameters from a second scan after the first scan of FIG. 13 in a specific embodiment.

FIG. 15 shows an example of information and associated parameters from a first scan for discovering a database upgrade in a specific embodiment.

FIG. 16 shows an example of information and associated parameters from a second scan after the first scan of FIG. 15 in a specific embodiment.

FIG. 17 shows an example of performing an operating system level check for a particular package in a specific embodiment.

FIG. 18 shows an example of information and associated parameters from a first scan for discovering a particular package in a specific embodiment.

FIG. 19 shows an example of information and associated parameters from a second scan after the first scan of FIG. 18 in a specific embodiment.

FIG. 20 shows an example of issuing an RPC call to a client in a specific embodiment.

FIG. 21 shows an example of checking the status of a particular client daemon in a specific embodiment.

FIG. 22 shows an example of information and associated parameters from a first scan for discovering a particular client daemon in a specific embodiment.

FIG. 23 shows an example of information and associated parameters from a second scan after the first scan of FIG. 22 in a specific embodiment.

FIG. 24 shows another example of issuing an RPC call to a client in a specific embodiment.

FIG. 25 shows another example of checking the status of a particular client daemon in a specific embodiment.

FIG. 31 shows an example for a client being removed from a list of clients that are periodically checked for status in a specific embodiment.

FIG. 32 shows an example for detecting network interface settings configured on the client in a specific embodiment.

FIG. 33 shows an example for detecting a fibre channel interface on the client in a specific embodiment.

FIG. 34 shows an example of client detection in a specific embodiment.

FIG. 35 shows an example of client certificate detection in a specific embodiment.

DETAILED DESCRIPTION

Figure 1:
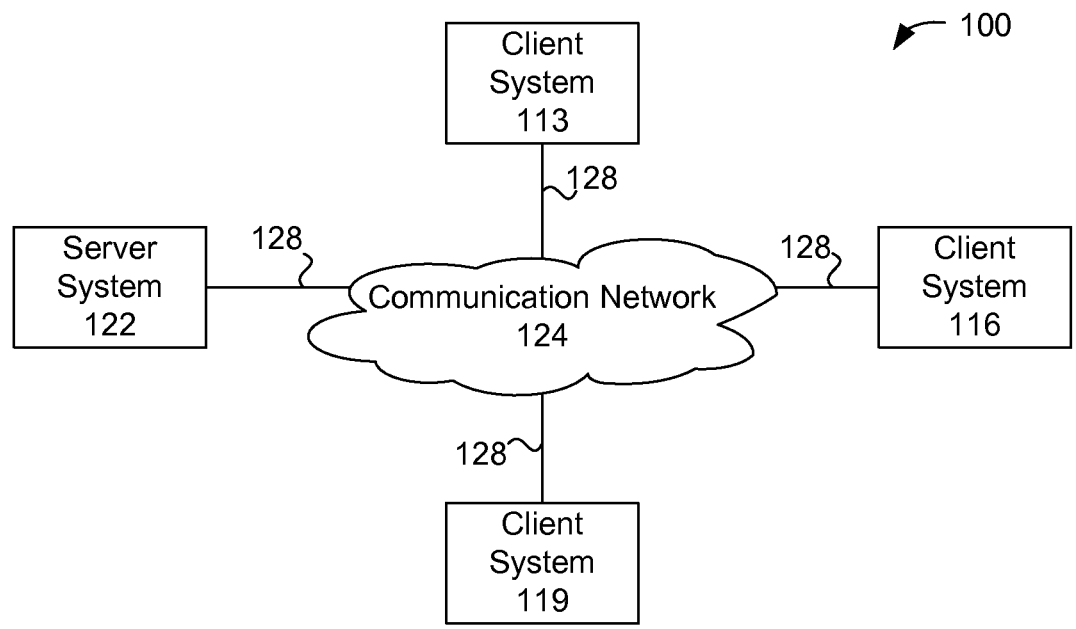
FIG. 1 shows a block diagram of a client-server system and network in which an embodiment of the system may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

Figure 2:
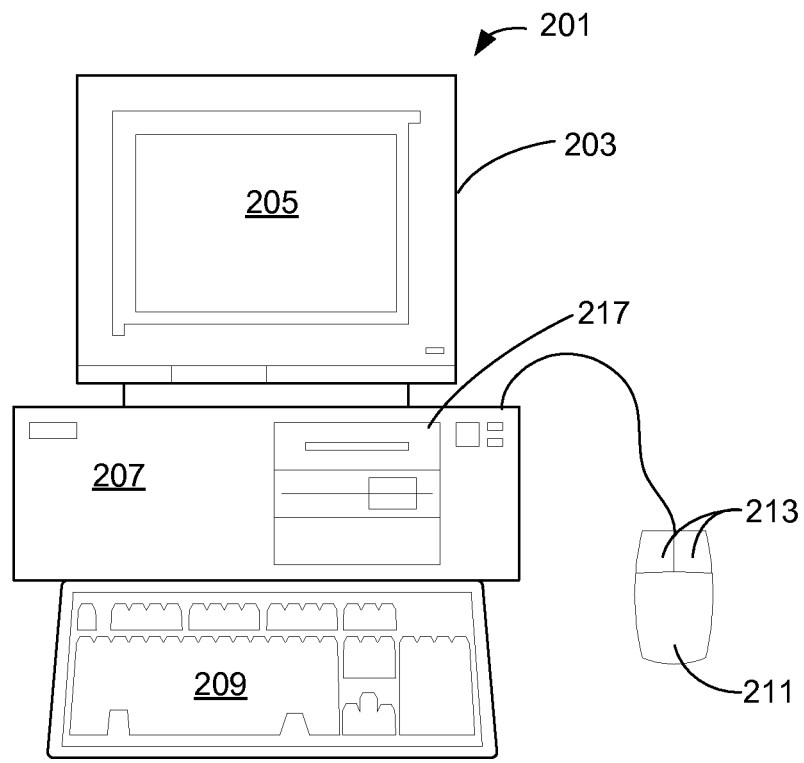
FIG. 2 shows a more detailed diagram of an example of a client or computer which may be used in an embodiment of the system.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, or through a network such as the Internet.

Figure 3:
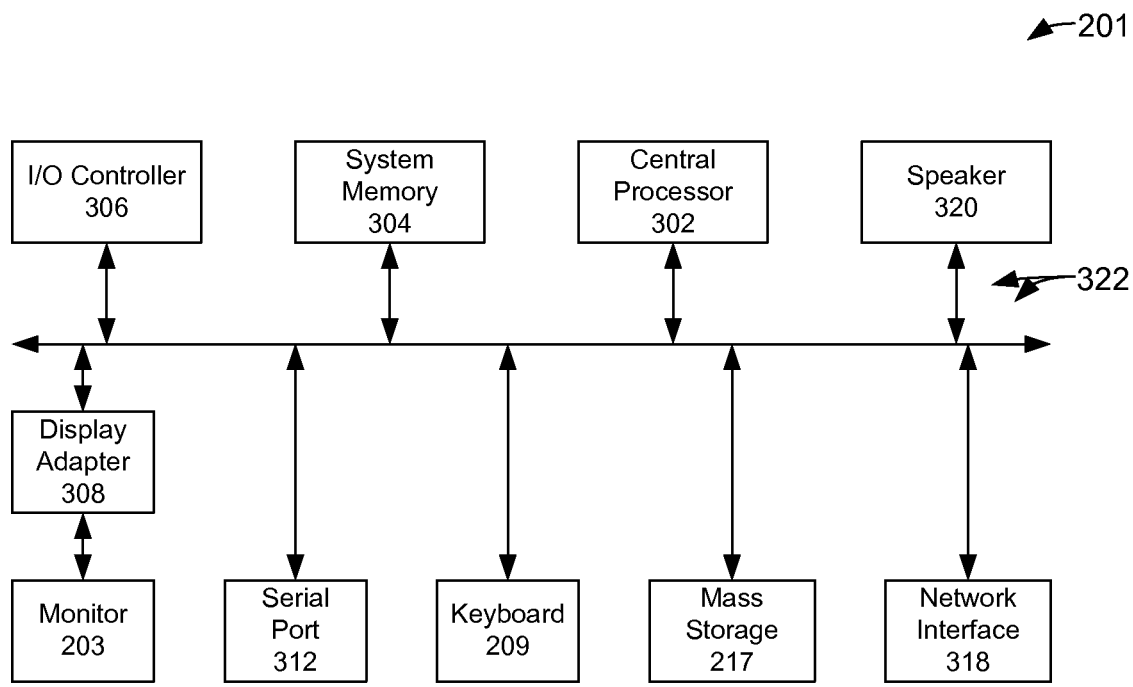
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
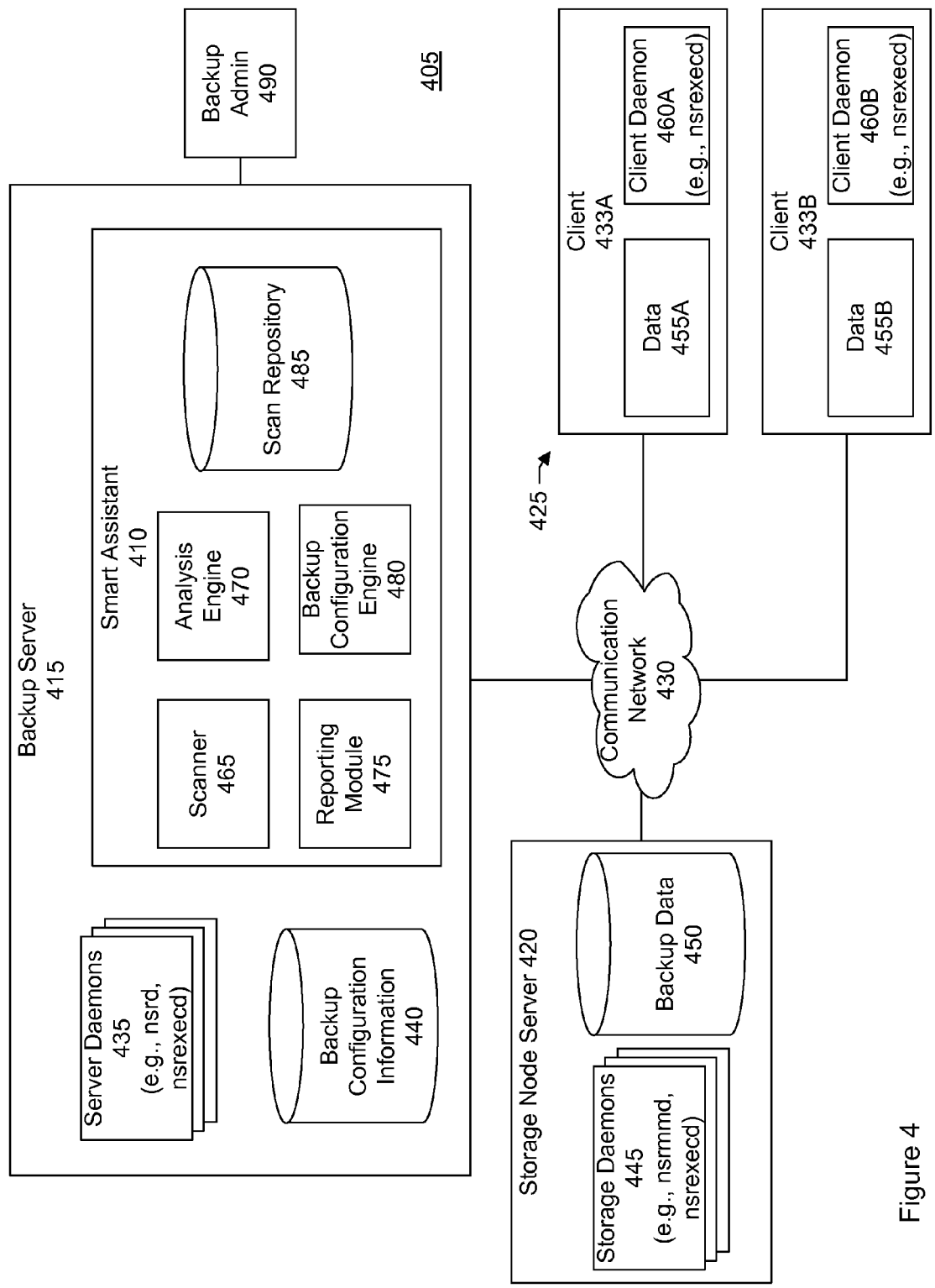
FIG. 4 shows an overall architecture of a system having a smart assistant for backups in a specific embodiment.

FIG. 4 shows a block diagram of a system 405 having a smart assistant 410. In a specific embodiment, the smart assistant is a tool that automatically discovers changes that may affect a backup and, upon approval of a backup administrator, automatically creates, configures, maintains, and updates backup configuration information based on those changes. In a specific embodiment, the system includes a backup server 415, a storage node server 420, and a set of clients 425, each of which are interconnected through a communication network 430. The communication network is as shown in FIG. 1 and described above.

The server is a general purpose computer that may include hardware and software such as shown in FIG. 3 and described above. For example, the server may include a processor, memory, applications, and storage. A client can be physical machine such as a shown in FIG. 2 and described above. Alternatively, a client can be a virtual machine (e.g., a client inside a hypervisor) or a virtual client that resides on a cluster. Although FIG. 4 shows two clients 433A and 433B, it should be appreciated that there can be any number of clients. For example, there can be tens, hundreds, or even thousands of clients depending upon factors such as the size of the enterprise.

In the example shown in FIG. 4, the backup server includes a set of server daemons 435, storage 440 to store backup configuration information, and smart assistant 410. The storage node includes a set of storage node daemons 445, and a repository 450 to store data 455A and 455B backed up from the clients. Client daemons 460A and 460B help to coordinate the backup of the data. A daemon is a computer program, service, or process that can run continuously in the background and that can perform a specified operation at predefined times or in response to certain events.

The backup configuration information may specify, for example, the location or address (e.g., Internet Protocol (IP) address of the clients to be backed up), the file names, folders, or directories on the clients to be backed up, the clients that should not be backed up, the file names, folders, or directories on the clients that should not be backed up, the destination of the backup (e.g., the location or IP address of the storage node), and other options, settings, properties, or parameters for backing up (e.g., whether backups should be encrypted, assigned host names, aliases, information on file system configurations and parameters, information on database configurations and parameters, information on local and remote processes, scripts, and utilities such as how they should be configured for the backup process, or whether they should be running or paused during the backup, conditions for backup, whether or not sub-directories should or should not be included in the backup), backup parameters associated with the database to be backed up (e.g., database installation path), backup parallelism parameters, network configurations, such as available network interfaces, and installed software information, such as specific software package version, or combinations of these.

FIG. 5 shows an example of backup configuration information 505 that may be used by the backup server to backup the clients. In this example, the configuration information is organized as a table. A source column 510 identifies the source client and directory on the source client that should be backed up. A destination column 515 identifies the destination (e.g., storage node) and directory on the destination where the backed up data should be stored. A parameters column 520 identifies the parameters and their corresponding values for the backup. It should be appreciated that FIG. 5 is merely an example of how backup configuration information may be organized. In other specific embodiments, the backup configuration information may be organized differently from what is shown in FIG. 5. For example, the backup configuration information may be organized or stored in one or more Extensible Markup Language (XML) formatted files or as one or more text files. The backup configuration information may be stored as one or more configuration files or in a database.

Referring now to FIG. 4, in a specific embodiment, the backup configuration information is stored in a central location, e.g., stored at the backup server. In this specific embodiment, the backup server daemon accesses the backup configuration information to identify the data (e.g., partition or database) on a particular client that should be backed up. Instructions including an identification of the data are then transmitted to a daemon at the client so that the client daemon can begin backing up the identified data.

In another specific embodiment, the backup configuration information or a portion of the backup configuration information is stored at the client. In this specific embodiment, the backup server sends a request to the client to begin backing up. The client accesses the locally stored backup configuration information to identify the data that should be backed up to the storage node. In some cases, it may be desirable to store the backup configuration at a central location in order to reduce the amount of storage needed at the client. In other cases, it may be desirable to store the backup configuration information (or a portion of the backup configuration information) at the client in order to reduce the amount of storage needed at the backup server.

The smart assistant includes a set of sub-modules, components, or code components including a scanner 465, an analysis engine 470, a reporting module 475, and a backup configuration engine 480. A scan repository 485 stores information obtained, gathered, or collected from a scanning operation. The smart assistant and its associated sub-modules are functional entities where implementation of its functions can vary. For example, in a specific embodiment, the smart assistant is integrated with a server daemon (e.g., nsrd) (see, e.g., FIG. 36). In another specific embodiment, the smart assistant is a daemon or code module that is separate from the server daemon, but executes on the same server machine as the server daemon (see, e.g., FIG. 37). In another specific embodiment, the smart assistant executes on a server machine separate from the backup server machine (see, e.g., FIG. 38).

In a specific embodiment, the smart assistant is provided in a product referred to as NetWorker from EMC Corporation. The NetWorker product includes server daemons nsrd (network save and recover daemon) and nsrexecd; storage node daemons nsrmmd and nsrexecd; and client daemons nsrexecd. Nsrd is the master service that controls other services on the NetWorker server, clients, and storage nodes. It monitors active save or recover program sessions. Nsrexecd authenticates and processes the NetWorker server remote execution requests and executes programs on the client to save the client data to the backup storage node. Nsrmmd writes the data from the clients to storage media. A backup flow can begin when the backup server daemon nsrd starts a scheduled backup. A remote execution request is sent to the client nsrexecd, requesting that it execute a command (e.g., a save command) to perform the backup. The client is directed by the backup server nsrd daemon to push the data to the storage node. The storage node daemon nsrmmd writes the data sent from the client to the appropriate backup data volume. In this specific embodiment, the backup configuration information may be referred to as a RAP database. The RAP database stores configuration information about each configured resource (e.g., NetWorker client).

There could be hundreds or thousands of clients (e.g., NetWorker clients) in a large enterprise. It can be very tedious and time-consuming to configure, maintain and update backup configurations in such large backup system. In a specific embodiment, the smart assistant periodically scans a specified network, identifies new clients, proposes configurations to a backup administrator 490, and creates client backup configurations as approved by the backup administrator. In another specific embodiment, the smart assistant periodically scans the existing clients, identifies new changes on the existing clients, proposes configuration updates to the backup administrator, and updates client backup configurations as approved by the backup administrator. In another specific embodiment, the smart assistant lists and notifies a backup administrator of the system, database, and network setting changes that have occurred on the specified network, existing client machines, or both. All notifications, suggestions, and requests made by the smart assistant once accepted by the backup administrator are implemented or configured automatically, where applicable.

In a specific embodiment, the smart assistant resides within a data zone and can periodically scan all clients from its client resources, or a set of the clients, or a network domain, to check, to notify, and to apply client system configuration changes. Client system configuration changes may include, but are not limited to newly added partitions, newly installed database applications, and newly installed networker clients. A data zone defines a single backup server and a group of clients that the backup server is responsible for backing up to a storage node.

More particularly, scanner 465 is responsible for scanning or directing the scanning of the network, clients connected to the network, or both. The scanner can store or access information about the clients and network to scan in one or more client resources files. For example, a resource file may include a listing of the clients to be scanned (e.g., a listing of Internet Protocol (IP) addresses of the clients in a data zone), a listing of clients not to be scanned, a network domain address of a network to be scanned, a subnet or range of client IP addresses within a network to be scanned or not scanned, or combinations of these.

Information collected from the scanning operations is stored in scan repository 485 for analysis engine 470 to access and analyze. The analysis engine is responsible for examining the scanning information to detect any problems or issues that may affect the backup, any changes in the network, any changes to an existing client connected to the network, or combinations of these. For example, problems that may affect the backup include a client daemon that is not functioning properly (e.g., "nsrexecd" is not running), the client is missing one or more software modules or programs that allow for a proper backup, or both. Changes to the network may include a new client being added to the network that may need to be backed up. Changes to an existing client may include a new partition created on the client, a new database installed on the client, an upgraded database, or combinations of these that may need to be backed up.

The reporting module is responsible for generating notifications to alert the backup administrator of problems or potential problems that may affect the backup, changes to the network, changes to the clients, or combinations of these. A notification may include a suggestion or recommendation for addressing the backup issue. In a specific embodiment, the reporting module includes a user interface or graphical user interface for the backup administrator to view the notifications and accept (or deny) the suggestions offered by the system to remediate the backup issue. In another specific embodiment, the reporting module includes a programmatic interface to interface with other modules of the backup system such as with a central management console. For example, notifications generated by the reporting module may be transmitted to the central management console. The central management console may include a GUI to display information to the backup administrator and receive input from the administrator. In another specific embodiment, the notifications may include e-mail alerts, text message alerts, RSS feeds (Really Simple Syndication), or combinations of these.

The backup configuration engine is responsible for creating backup configuration information, updating backup configuration information, or both. For example, if the analysis engine determines that a new client has been added to the network (and the backup administrator wishes to include the new client in the data zone of clients to be backed up), the backup configuration engine can automatically add the new client to the backup configuration information. For example, the backup configuration engine may add an entry to a backup configuration table. The entry may include the identity (e.g., IP address) of the new client to be backed up.

Figure 6:
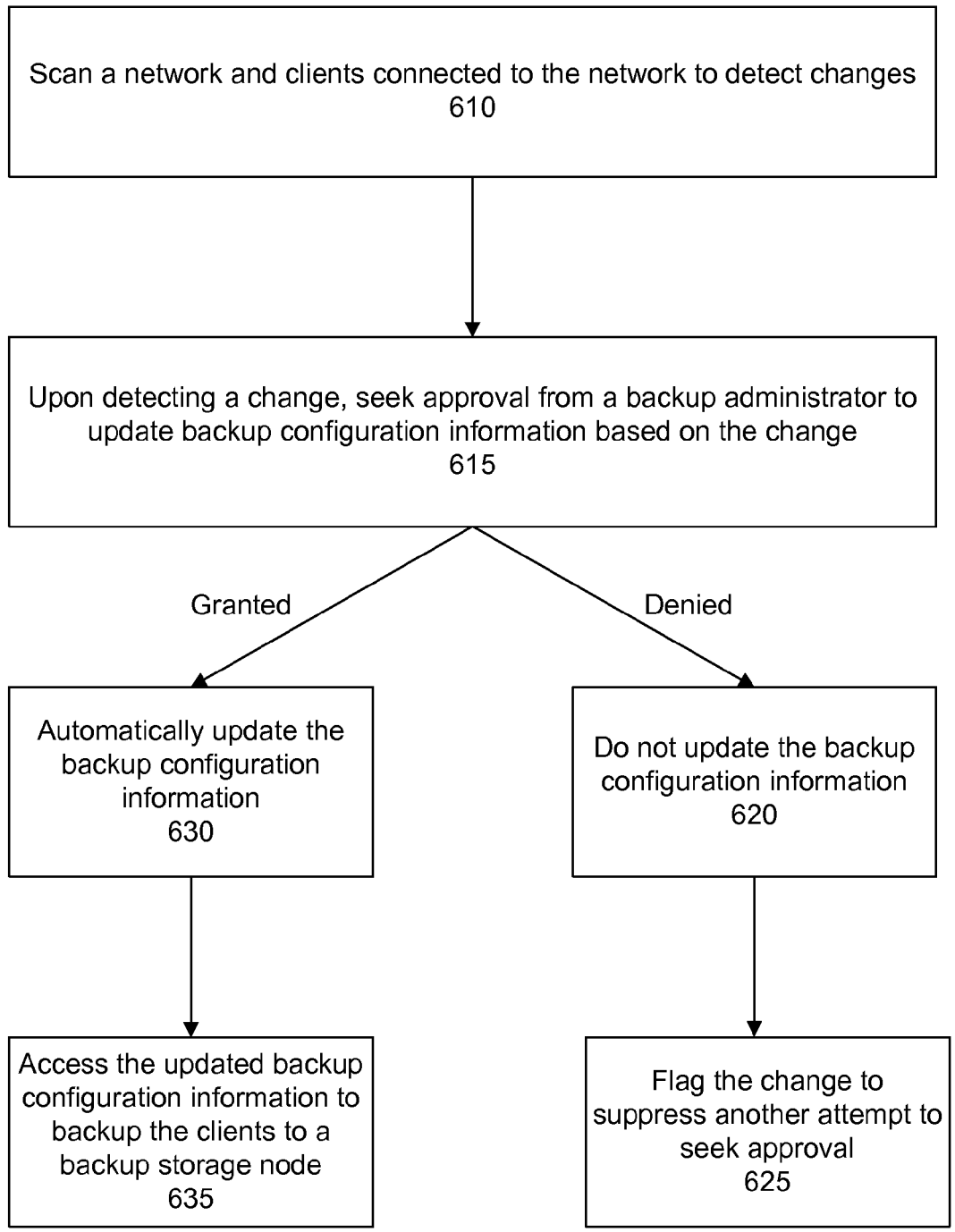
FIG. 6 shows an overall flow diagram of the smart assistant in a specific embodiment.

FIG. 6 shows an overall flow 605 of a specific embodiment of the smart assistant. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, the smart assistant scans or directs the scan of a network, clients connected to the network, or both to detect changes or other problems. The smart assistant scanner includes logic to execute any suitable scan technique or combinations of scanning techniques. Some examples of techniques for scanning include a network ping to a particular IP address. A network ping can include sending Internet Control Message Protocol (ICMP) echo request packets to the target and waiting for an ICMP response. The time from transmission to reception (round-trip time) is measured and any packet loss is recorded. Another example of scanning includes remote procedure calls (RPC). A remote procedure call (RPC) is an inter-process communication that allows a computer program to cause a subroutine or procedure to execute in another computer on the network. For example, the command "rpcinfo" may be used to list the programs on the remote computer. In a specific embodiment, the command "nsrrpcinfo" may be used to discover the NetWorker daemons on the remote computer (e.g., remote client).

In a specific embodiment, the scanner communicates with a client agent or daemon (e.g., client daemon "nsrexecd") that helps to gather information about the client. In a specific embodiment, the client agent is configured to communicate with the smart assistant. In other words, the client agent may receive instructions, requests, or commands from the smart assistant and respond accordingly. The client agent may be installed at a root level of the client so that it has access to administrative level commands, privileges, files, directories, and partitions. The client agent includes logic or code to gather information about the client and report the information to the smart assistant. Such information may include a listing of processes or services executing on the client, file system information, a listing of folders and files on the client, client system information (e.g., disk capacity, total disk capacity, available disk space, memory, or processors), directory structure, partitions, file sizes, application metadata and parameters for applications installed at the client, application installation locations (e.g., folder path), libraries installed at the client, and so forth.

It should be appreciated, however, that the client agent or daemon is not necessarily required for gathering information about a client. For example, techniques such as TCP/IP ping or RPC level calls can be issued to provide information about a client—regardless of whether or not that client includes an installation of the daemon. Further, information regarding the lack of the daemon on a client is also useful. In particular, the lack of a particular daemon on a client can indicate that the client will not be properly backed up to the storage node. In a specific embodiment, the smart assistant issues a communication or request to a client to check for a particular agent on the client. Based on the response from the client (or lack of response from the client), the smart assistant may determine that the client will not be properly backed up to the storage node. As another example, if the client was accidentally powered-off or shut-down, the client will not respond to a ping. In these cases, a notification may be generated to alert the administrator.

An example of a technique that may be used to gather information about a client includes examining a registry (e.g., Windows Registry) on the client. The Windows Registry is a hierarchical database that stores configuration settings and options on Microsoft Windows operating systems. It contains settings for low-level operating system components and for applications running on the platform that use the registry.

For example, when a new database is installed on a Windows client, the database application will typically make an entry in the registry file so that the database can properly access the services provided by the client operating system. Another technique for scanning a client includes scanning or searching for particular folders or paths. For example, databases typically have a default installation path. In a specific embodiment, the scanning can include identifying a default installation path of a database and searching the client for the default installation path. This approach can be helpful in cases where the client (or client OS) does not use a registry. For example, the client OS may be Unix which does not use a registry. In this case, scanning a client may include scanning or searching the client for particular application files, folders, directories, services, processes, or combinations of these.

Figures 7, 8:
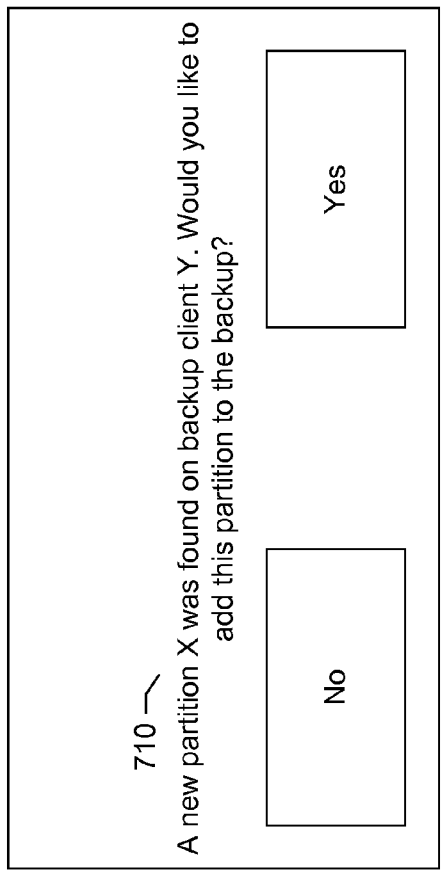
FIG. 7 shows an example of a request for approval sent to a backup administrator in a specific embodiment.
FIG. 8 shows an example of the table storing backup configuration information having been automatically updated by the smart assistant in a specific embodiment.

In a step 615, upon detecting a change, the smart assistant seeks approval from the backup administrator to update the backup configuration information based on the change. FIG. 7 shows an example of a notification 705 that may provided to the backup administrator. In this example, the notification appears in the form of a dialog box. The notification can be tailored or customized by the smart assistant depending upon the nature of the detected change or problem. For example, there can be notifications to inform the backup administrator of a new partition on a client, a new database installed on a client, a database upgrade on a client, a new client, specific software modules associated with backing up data found (or not found) on a client, issues with a backup agent or daemon found (or not found) on a client, and so forth.

In this example, the notification includes a message 710 indicating that a new partition has been found on a particular client and a request as to whether or not the administrator would like to add the partition to the backup. The administrator may click a "yes" button to add the partition to the backup or a "no" button to not add the partition to the backup.

Alternatively, the smart assistant can automatically accept or deny the changes based on predefined rules and criteria. For example, there can be a first rule having a condition or criteria that specifies all newly discovered partitions are to be automatically added to the backup. Thus, in this example, when the condition has been satisfied (e.g., a new partition has been discovered), the new partition will be automatically added to the backup without seeking prior approval from the backup administrator. A notification may be sent to the backup administrator indicating that the new partition has been added to the backup.

As another example, there can be a second rule having a condition that specifies all newly discovered databases require approval before they are added to the backup. Thus, in this example, when a new database has been discovered, the system will seek approval from the backup administrator before adding the new database to the backup.

Rule conditions or criteria can include or be based on client id or address (e.g., a new partition discovered on client IP address X should be automatically added to the backup without seeking prior approval, a new partition discovered on client IP address Y requires approval before adding to the backup), database type or name (e.g., new databases identified as "production" should be automatically added to the backup without seeking prior approval, new databases identified as "testing" require approval before adding to the backup, or, alternatively, new databases identified as "testing" should not be added to the backup and a notification of such should not be generated), database upgrade version (e.g., a database that has been upgraded should be automatically added to the backup without seeking prior approval), or any other parameter or combination of parameters as desired.

The ability to pre-define and store rules provide the backup administrator with very granular control over what types of changes should be automatically reflected in the backup without seeking prior approval, what types of changes require approval for updating the backup, and what types of changes should not result in updating the backup. This helps to ensure that the backup administrator does not become inundated with approval requests and that changes are properly incorporated (or not incorporated) into the backup.

For example, as described above, a rule can be configured such that all newly discovered production databases are added to the backup without seeking approval since such databases are typically used to support actual business processes. Alternatively, a rule can be configured such that all newly discovered testing databases require approval (or, alternatively, should be ignored) since such databases are typically used for testing purposes and not to support actual business processes. All changes can be recorded in the scan repository in 485 and reported via the reporting module 475 from FIG. 4.

It should be appreciated that the dialog box shown in FIG. 7 is merely an example of a particular interface. For example, in another specific embodiment, the system may collect the changes into a list that is then displayed to the backup administrator (e.g., displayed as a web page in a browser). The changes in the list may be accompanied by a corresponding set of check boxes so that the administrator can approve a change (check a corresponding box) or deny a change (leave the corresponding box unchecked).

Referring now to FIG. 6, in a step 620, if the administrator denies the request to update the backup configuration information, the backup configuration information is not updated. In a step 625, the change may be flagged to suppress or refrain from another attempt to seek approval to update the backup configuration information. For example, to flag the change information or details associated with the change may be tracked and stored such as in a table or index. The information may include the IP address of the client associated with the change, the type of change (e.g., new partition, new database, database upgrade, or new client), information identifying the particular change (e.g., the name of the partition added, the name of the database added, the database upgrade version), and so forth. If the change is subsequently detected on a later scan, the smart assistant— prior to seeking approval from the administrator to update the backup configuration information—can consult the table to determine whether the administrator has already denied the request. This helps to improve the user experience because the backup administrator will not be asked to approve requests he or she has previously or already denied.

Alternatively, in a step 630, if the administrator approves the request to update the backup configuration information (e.g., clicks "yes" to add the partition to the backup), the smart assistant automatically updates the backup configuration information based on the change. For example, FIG. 8 shows an example of an entry 810 that may be added by the smart assistant to the backup configuration information. A first field of the entry specifies the source of the data to be backed up such as the IP address of the client and the partition (e.g., "DB2"). A second field of the entry specifies the location of the storage node that will store the backed up data. A third field can specify one or more parameters associated with the backup of that particular source.

Automatically updating stored backup configuration information may include adding new information to the stored backup configuration information, deleting information from the stored backup configuration information, replacing at least a portion of the stored backup configuration information with new information, modifying the stored backup configuration information, transmitting new backup configuration information to a client to replace or augment existing backup configuration information stored at the client, changing a value of a backup configuration parameter in the configuration information, deleting a backup configuration parameter from the configuration information, adding a backup configuration parameter to the configuration information, or combinations of these.

In a specific embodiment, the smart assistant makes updates to the backup configuration information via the backup configuration engine. The engine is fully aware of the type, location, credentials, and communication method required to update the backup configuration information. Depending on the type of modification and the type of configuration entity it has to modify, the smart assistant may use the established application programming interface (api) calls, library calls, configuration file updates, resource file updates, command line utilities, scripts, OS calls and even a graphical user interface (GUI) if appropriate to update, modify, delete, add, or manipulate the backup configuration information. For example, if an alias needs to be modified for a client, the assistant can issue an OS command to update the /etc/hosts file, a nsradmin CLI (Command Line Interface program) to update the /nsr/res for the specific client resource on the NW server. The backup configuration information can include resources and configurations based on NSR resources (e.g., EMC Network Save and Recover resources), server configuration, client configuration files, other environment configuration, or combinations of these.

In some cases, automatically updating the backup configuration may include pushing or transmitting to the client a backup module to be installed at the client, pushing an update to an existing software module installed at the client, uninstalling or deleting a software module from the client that may be incompatible with the backup, transmitting client backup configuration information to the client, or combinations of these. For example, in some cases, backing up a newly installed database at a client may require an additional software module to be installed at the client. The smart assistant, upon the backup administrator approving the request to backup the database, can automatically send to the client the required backup module.

In a step 635, the backup server accesses the updated backup configuration information to backup the clients to the backup storage node.

Figure 9:
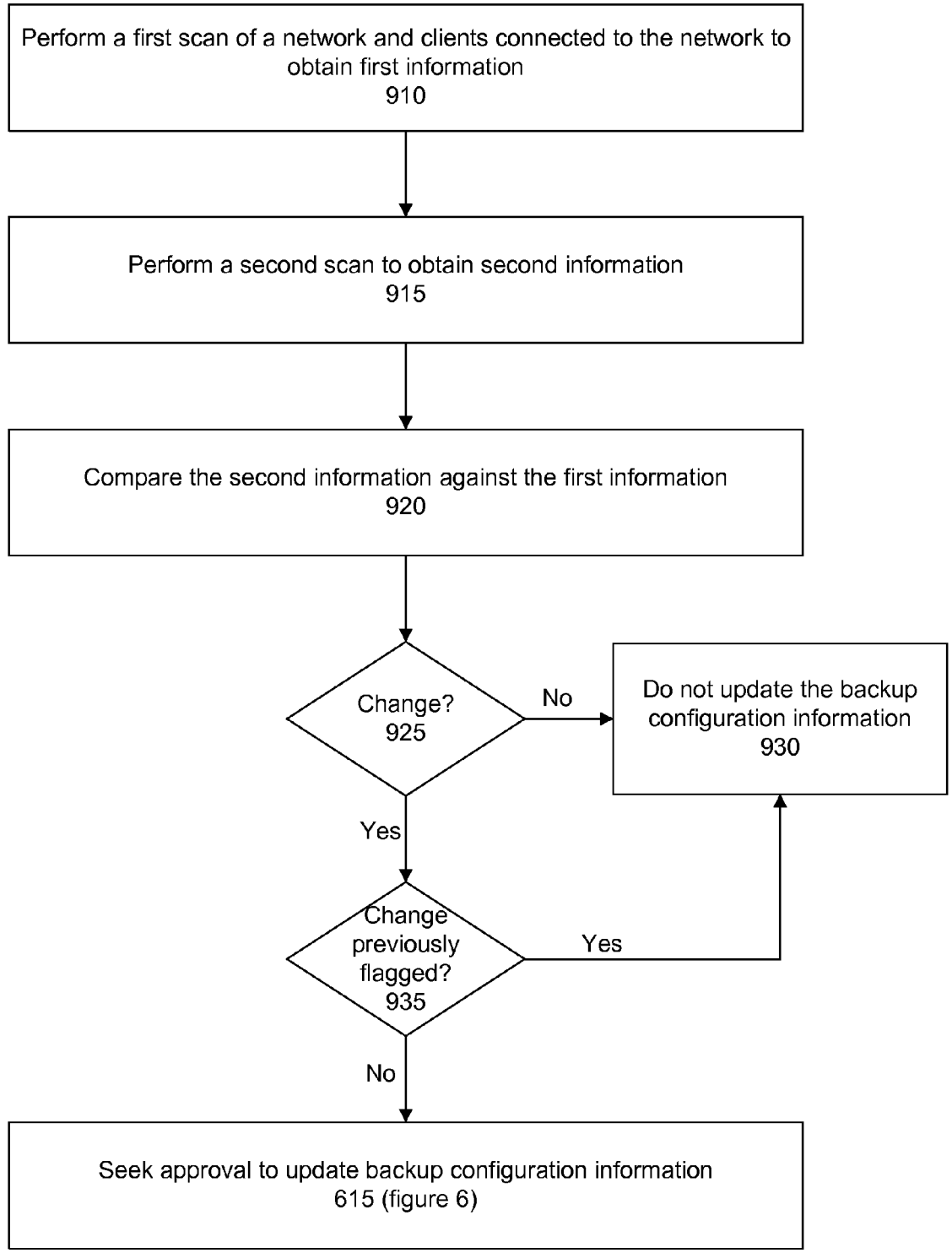
FIG. 9 shows a flow diagram for detecting changes in a specific embodiment.

FIG. 9 shows a flow 905 of a specific embodiment of the scanning operation in step 610 (FIG. 6) for detecting changes or other potential backup issues. In a step 910, the smart assistant conducts a first scan of the network, clients, or both to obtain first information. In a step 915, the smart assistant conducts a second scan to obtain second information. In a specific embodiment, the second scan is conducted after the first scan and before a next backup. This helps to ensure that any changes, issues, or problems are resolved before the next backup.

In a step 920, the smart assistant compares the second scan (or second information) against the first scan (or first information) to determine (step 925) whether there are any changes between the scans. For example, a change may include that a new partition that was added to a client between the scans, a new database was installed on a client, a database was upgraded on a client (e.g., first scan information listed a first version of a database on a client and second scan information listed a second version of the database on the client, later than the first version), a particular software module was discovered, a new client was found, a new IP was found, a new type of network interface (e.g., a fibre channel interface) on a client was detected, a service was enabled, a service was disabled, a patch was installed, a client is missing (e.g., client present in first scan but missing in second scan), client was renamed (e.g., two clients have the same footprint or databases, but have different names), new client alias, or combinations of these.

If no change was detected, the backup configuration information is not updated (step 930). Alternatively, if a change was detected, in a step 935 the smart assistant checks whether or not the change had been previously detected and flagged. If the change was previously detected and flagged, the backup configuration information is not updated (step 930).

Alternatively, if the change is a new change, the flow proceeds as shown in FIG. 6, step 615. That is, the smart assistant seeks approval from the backup administrator to update the backup configuration information. And, if granted, automatically updates the backup configuration information (step 630, FIG. 6).

Figure 10:
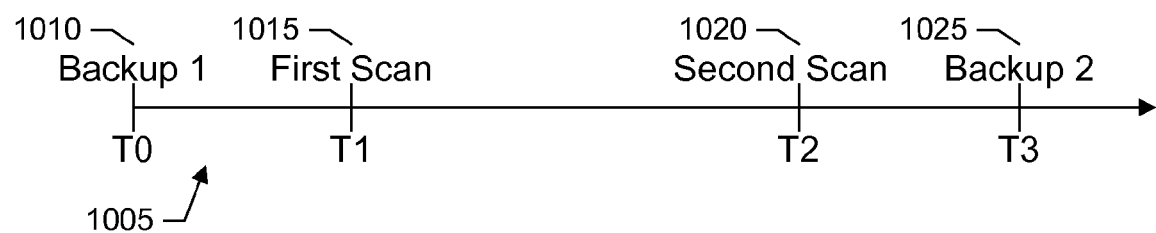
FIG. 10 shows a timeline of scans in a specific embodiment.

FIG. 10 shows a timeline 1005 for the scanning operations in a specific embodiment. At a time T0, a first backup 1010 is performed. In this specific embodiment, after the first backup, a first scan 1015 is performed at T1. A second scan 1020 is performed after the first scan at a time T2. The second scan occurs before a next backup 1025 is performed at a time T3. Thus, any changes or other issues that happen after the first scan can be resolved before the next backup. In turn, this helps to ensure that the clients can be properly backed up and properly restored when desired. For example, in some cases, a backup administrator may have changed an alias or other client name or identifier, but the change may not have been properly propagated throughout the system and the backup configuration. The backup may proceed as scheduled, but there may be errors when trying to recover the data because the client (now having a different name) may have been indexed improperly. In another specific embodiment, first scan 1015 may be before first backup 1010.

In a specific embodiment, a method for scanning includes determining a start time of a backup, and prior to a pre-determined duration before the start time, conducting a scan of a network, clients connected to the network, or both. The pre-determined duration can be configurable by the backup administrator. For example, the backup administrator may set the duration to be 5 hours. This give the administrator an approximately 5 hour window to review, accept (or deny or modify) any changes detected by the system and suggestions offered by the system before the next backup.

In a specific embodiment, the backup administrator can configure the frequency of the scans. For example, the backup administrator may configure the scans to be once a day, twice a day, and so forth as desired. Thus, if a particular organization often makes changes, the backup administrator may configure the system so that scans are more frequent as compared to another organization that makes fewer changes. Increasing the frequency of scans helps to ensure that changes are detected and considered before the next backup. Decreasing the frequency of scans, however, helps to conserve network bandwidth and computing resources.

The system is flexible in that backup administrators can configure the scan frequencies according to the needs of the organization. In a specific embodiment, the system supports on-demand scans. For example, the system may provide the backup administrator with a button or other graphical control that the administrator can manually click to initiate a scan. Instead or additionally, a scan may be initiated programmatically or upon receipt of a particular e-mail, text message, or both from the administrator (e.g., administrator can initiate an on-demand scan by sending e-mail to system with the subject line "Begin Scan").

FIGS. 11-35 show some example use cases in various specific embodiments. As discussed above, in a specific embodiment, the smart assistant is provided with a product referred to as NetWorker from EMC Corporation. In this specific embodiment, the clients to be backed up may be referred to as NetWorker clients (NW clients) and the backup server may be referred to as the NetWorker server (NW server). Some of the following examples include references to the NetWorker client and NetWorker server. It should be appreciated, however, that aspects and principles of the system can be applied to a variety other backup products and services.

FIGS. 11-12 show scans detecting a new partition having been added to a client (e.g., a NetWorker client). FIG. 11 shows a first scan 1105 of a client and parameters 1110 associated with the first scan. FIG. 12 shows a second or subsequent scan 1205 of the client and parameters 1210 associated with the second scan. The information from the scans lists the various partitions found on the client.

In a specific embodiment, the smart assistant will identify the change (e.g., new partition) on the next scan, and will propose a request to the backup or NetWorker administrator to add the partition for backup. A change request will be visible on the user interface of a management console (e.g., NetWorker Management Console (NMC)). The NW administrator is able to accept or deny the change. If the request is accepted, the newly added partition will be included in the client backup configuration automatically. If denied, the partition would be excluded from the backup and there will be no more requests to back up the partition.

In particular, the smart assistant compares the two scans, and based on the comparison, identifies or detects that a new partition 1215 that has been added. In other words, the smart assistant may determine that the partition is new because it does not appear in the information collected during the first scan, but appears in the information collected during the second scan. In this specific embodiment, the smart assistant will notify the backup administer of the new partition, and suggest modifications to the client resource (e.g., backup configuration information) for inclusion.

FIGS. 13-14 show scans detecting a new database having been installed on a NetWorker client. FIG. 13 shows a first scan 1305 of a client and associated parameters 1310. According to information collected from the first scan, no database has been detected. FIG. 14 shows a second scan 1405 of the client. According to a comparison of information collected from the first and second scans, a database 1410 and parameters 1415 associated with the database have been detected. The smart assistant can include the parameters as a suggestion in a request to the administrator to add the database to the data zone.

In a specific embodiment, the smart assistant identifies a newly installed database by conducting a check of the registry, examining default system paths, searching for database installation paths, or combinations of these. Other techniques may instead or additionally be used. As an example, a first pass of the client may include checking the registry for an entry indicating that a database has been installed. If no entry can be found, a second pass may include searching the client for a pre-determined path in which the database is typically found. The search may include, for example, traversing a directory tree of the file system on the client to find a path that matches the pre-determined path that the database manufacturer uses to install the database. Another technique that may be used to search for a database includes running or issuing an "su" or switch user command to a database user name (e.g., "su-oracle"). Successful execution of the command can indicate the presence of that particular database. Another technique that may be used includes running or issuing a process command to search for processes associated with the database.

Once a newly installed database is identified by the smart assistant, the smart assistant automatically generates a request to configure a database client backup configuration. The request includes information describing the details of the configuration and dependency of the configuration. The dependency may include, for example, any additional software that would be required on the client, such as the NetWorker Module for Databases and Applications (NMDA) or NetWorker Module for Microsoft Applications (NMM). Once the request is accepted, the related software is automatically provided to the client by the smart assistant, automatically installed at the client, and the database backup configuration is automatically generated. If the request is denied, the database is excluded from the backup.

FIGS. 15-16 show scans detecting a new database having been upgraded on a NetWorker client. FIG. 15 shows a first scan 1505 of a client and associated parameters 1507. According to information collected from the first scan, the client includes a DB2 database. A parameter 1510 specifies a value of the database installation path (e.g., "/DB2/9.7/bin"). A parameter 1515 specifies a value of the database version (e.g., "9.7"). A parameter 1520 specifies a value of the database location (e.g., "/Symmetrix/Lun10/Instance_01").

FIG. 16 shows a second scan 1605 of the client and associated parameters 1607. According to a comparison of information collected from the first and second scans, the DB2 database has been upgraded from version 9.7 to version 10.1. More particularly, a parameter 1610 specifies a value of the database installation path (e.g., "DB2/10.1/bin"). A parameter 1615 specifies a value of the database version (e.g., 10.1). A parameter 1620 specifies a value of the database location (e.g., "/Symmetrix/Lun11/Instance_01").

The smart assistant can include with the request to the backup administrator a set of suggested parameters 1625 for including the upgraded database in the backup.

In a specific embodiment, the smart assistant identifies any database upgrades. If the system (e.g., NetWorker backup system) supports any new features, requires any configuration updates on the new database version, or both the smart assistant will generate a request to apply the configuration changes accordingly. The smart assistant sends a request to NetWorker to modify the database client resource with suggested parameters or changes. It will also suggest enabling any new NetWorker features that are applicable to the new database version.

Consider, as an example, that the user has upgraded their Oracle database from Oracle 11 to 12c. Oracle 12c includes a new feature called pluggable databases. Pluggable databases allow multiple databases to run under one copy, or instance, of the Oracle database software. Under a pluggable database architecture, there is a first portion of the database referred to as a root or container database that holds the functionality and metadata required to run the database itself. A second portion of the database includes the user's database which is independent from the container database. Pluggable databases allow multiple tenant databases to run under one copy of the database. In this case, the notification to the backup administrator may include a suggestion to enable a feature of the backup system that supports backing up a pluggable database.

In a specific embodiment, the smart assistant stores a listing of software applications including application version (e.g., a listing of database applications) and a corresponding listing of client software modules that are required for properly backing up a client that has the particular application version. When the smart assistant discovers that a particular application version has been installed at the client (e.g., a particular database version has been installed at the client), the smart assistant can consult or cross reference the application version with the listing to identify any client software modules that might be required to properly backup that particular application version.

In another specific embodiment, the smart assistant stores a listing of software products including the latest version number of a software product. When the smart assistant discovers a particular software product installed on a client, the smart assistant can consult or cross reference the software product with the list to determine whether the client has the latest version of the software product. If the client has an earlier version, the smart assistant can generate a notification to the backup administrator to inform the administrator that there is a later version of the product. This helps to ensure that software on the client is up-to-date.

FIGS. 17-19 show some techniques for identifying a specific backup software module on the client. In a specific embodiment, the backup software module is a plug-in for backing up a database. In this specific embodiment, the plug-in is referred to as a DD Boost Direct Plug-in or Data Domain Boost for Databases and Applications (DDBDA) as provided by EMC Corporation. In this specific embodiment, this plug-in allows customers to perform back-ups of their database using a third-party backup server.

Thus, the presence of the module on the client indicates that the client is not part of a specific data zone of clients whose data is backed up by the backup server. Instead, the data may be backed up by a third-party backup server. In this specific embodiment, the smart assistant is able to identify the existence of a DD Boost Direct (or DDBDA) plug-in. Once the plug-in is identified, a request seeking permission to migrate to a NetWorker Module for Databases and Applications (NMDA) or NetWorker Module for Microsoft Applications (NMM) client will be generated and visible to the NetWorker backup admin. The NetWorker backup admin can then decide whether to accept or deny the request. For example, if the backup administrator accepts the request, the client will be added to the data zone. An entry may be made in the backup configuration information to identify the client as a source client in the data zone. The backup server will be responsible for the backups and the third-party backup server may be bypassed.

More particularly, FIG. 17 shows an example for detecting or checking for a particular software module or package 1705 (e.g., "emcddbda") at the operating system level. As another example, a library check on the client may instead or additionally be performed.

FIG. 18 shows results of a first scan 1805 of a client and associated parameters 1810 to search for the particular package name (e.g., "emcddbda"). FIG. 19 shows results of a second scan 1905 and associated parameters 1910. As shown in the information collected from the second scan, a specific package 1915 has been found on the client. The smart assistant will then include in a notification to the backup administrator a suggestion to migrate the client to a NetWorker modules deployment.

FIGS. 20-23 show some techniques for detecting whether a new client on the network domain includes a client daemon (e.g., "nsrexecd") for coordinating backups. If the client daemon has been detected, a determination can be made as to whether the client should be added to the data zone managed by a particular backup server. FIG. 20 shows an example 2005 of issuing an RPC call 2010 to detect the NetWorker client response. FIG. 21 shows an example 2105 of issuing an RPC call 2110 to check a status of the client daemon such as whether the client daemon (e.g., "nsrexecd") is properly running (e.g., is alive and responding). For example, the status of program number 390113 (the nsrexecd daemon running on the client) from the listing shown in FIG. 20 can be verified using the command rpcinfo as illustrated in the example of FIG. 21.

FIG. 22 shows a first scan 2205 of a client and associated parameters 2210. FIG. 23 shows a second scan 2305 and associated parameters 2310. As shown in the information collected from the second scan, a client daemon 2315 (e.g., "nsrexecd") has been detected on the client.

Upon finding the NetWorker client daemon, in a specific embodiment, the smart assistant will check whether the client resource has correct permissions to be configured on the NetWorker server. If the client can be added to the NetWorker server, the smart assistant will generate a request to add and configure the NetWorker client in the NetWorker server.

For example, in some cases it will be desirable to exclude a client from being backed up to one or more specific NetWorker servers. It may be desirable to allow a client to be backed up to only one or more specific NetWorker servers. This permission check allows the backup system to be presented as a service to multiple customers in a multi-tenant environment. In a multi-tenant environment, it can be desirable to segment the clients of the different customers so that each customer is associated with their own NetWorker server. Thus, there can be a first set of clients of a first customer, where the first set of clients are backed up by a first NetWorker server. There can be a second set of clients of a second customer, different from the first customer, where the second set of clients are backed up by a second NetWorker server, different from the first NetWorker server.

In a specific embodiment, a "positive list" file is stored at a NetWorker client. The "positive list" file lists the various NetWorker servers that can configure and backup the client. In this specific embodiment, this is the /nsr/res/servers file on the client and this can be parsed by the smart assistant to determine whether the new NetWorker client can be configured to the NetWorker server. In another specific embodiment, a "negative list" file is stored at a NetWorker client. In this specific embodiment, the "negative list" file lists the various NetWorker servers that are not allowed to configure and backup the client.

In a specific embodiment, a method includes determining that there is a new client connected to the network that includes a client backup daemon but is not being backed up to a backup server, examining a permissions file stored at the client to determine whether the client is allowed to be backed up to the backup server, where the permissions file lists one or more backup servers that are allowed to back up the client, if the backup server is listed in the permissions file, seeking permission from a backup administrator to back up the client using the backup server, and if the backup server is not listed in the permissions file, not seeking the permission. Seeking permission can include suggesting to the backup administrator a creation of a new client resource to be added to the NetWorker server.

FIGS. 24-27 show some techniques for detecting a new IP address in a domain where the client backup daemon (e.g., "nsrexecd") is not installed on the associated client or is not running In a specific embodiment, the smart assistant will periodically scan a range of IP addresses. If a new IP address is found, the smart assistant will perform RPC calls to verify whether the client backup daemon (e.g., "nsrexecd") is running on the client. If nsrexecd is not running, a notification will be generated to indicate an unprotected client has been found.

In a specific embodiment, the notification will include an indication of the new potential IP or machine found on the network or DataZone along with the OS name and other relevant details pertaining to the machine (e.g., installed database name and version, partitions, used disk space, available disk space, software packages, and so forth). The notification may also include a suggestion as to what type of backup or client resource may need to be created on the server (for this client). Further, as discussed, the system provides the ability to configure this new client to the DataZone automatically (providing the administrator accepts the suggestions). In a specific embodiment, the system allows the administrator to override a suggestion or alter a suggested backup configuration parameter (e.g., change a default location of the backup).

Figure 26:
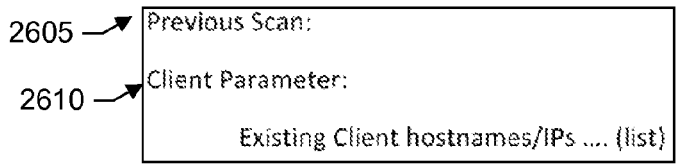
FIG. 26 shows another example of information and associated parameters from a first scan for discovering a particular client daemon in a specific embodiment.
Figure 27:
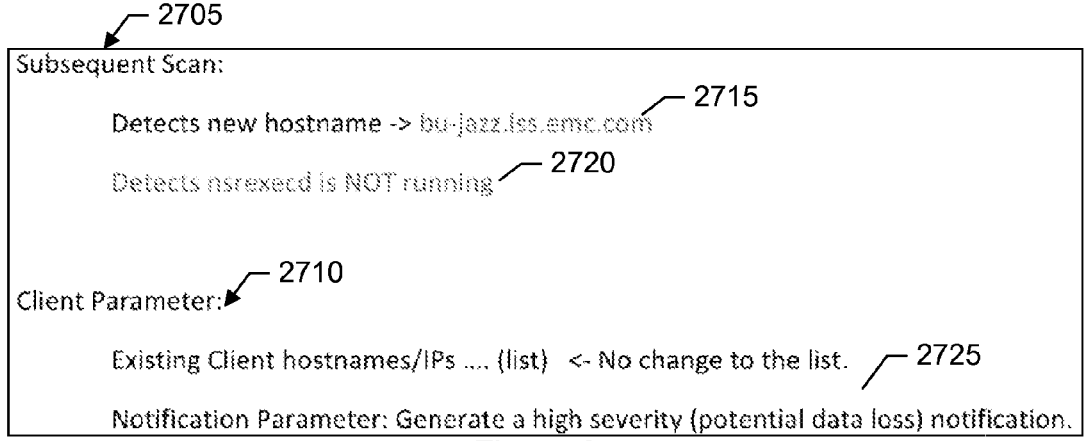
FIG. 27 shows another example of information and associated parameters from a second scan after the first scan of FIG. 26 in a specific embodiment.

FIG. 24 shows an example 2405 of making an RPC call 2410 to detect the client response. FIG. 25 shows an example 2505 of issuing an RPC call 2510 to check whether the client daemon (e.g., "nsrexecd") is properly running (e.g., is alive and responding). FIG. 26 shows a first scan 2605 and associated parameters 2610. FIG. 27 shows a second scan 2705 and associated parameters 2710. As shown in the information collected from the second scan, a new hostname 2715 has been detected and a client daemon 2720 is not running. A notification parameter 2725 may be generated to identify the notification as being a high severity because data is not being backed up. In this example, the smart assistant will suggest the deployment of the Net-Worker client software to the discovered IP and start the NetWorker client daemons.

FIGS. 28-31 show some techniques for determining that an existing NetWorker client IP (hostname) is unreachable.

In a specific embodiment, the smart assistant will periodically ping its internally tracked client hostnames. In other words, the smart assistant may store a list that tracks client hostnames to ping. If a host is unreachable, a notification will be generated to indicate an unprotected client or a removal of a client from the backup configuration. The NetWorker administrator will be advised to check the client connectivity and decide on the automatic removal of the NetWorker client resource.

Figure 28:
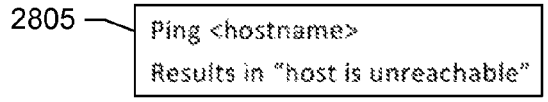
FIG. 28 shows an example of issuing a ping in a specific embodiment.
Figure 29:
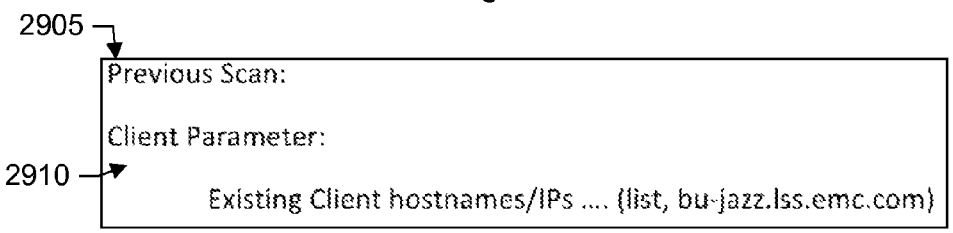
FIG. 29 shows an example of information and associated parameters from a first scan for checking the status of a client in a specific embodiment.
Figure 30:
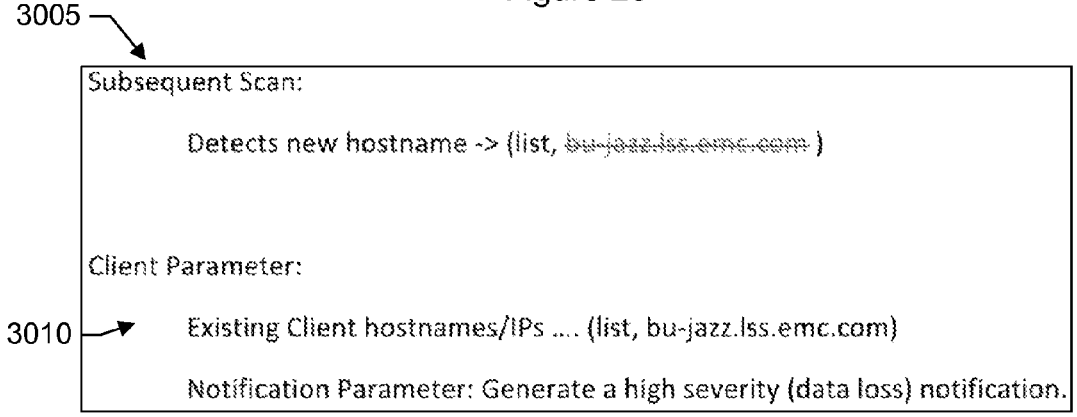
FIG. 30 shows an example of information and associated parameters from a second scan after the first scan of FIG. 29 in a specific embodiment.

FIG. 28 shows an example of issuing a ping command 2805. FIG. 29 shows a first scan 2905 and associated parameters 2910. FIG. 30 shows a first scan 3005 and associated parameters 3010. FIG. 31 shows an example of removing the client from the list of clients to ping upon the administrator acknowledging the client removal.

As discussed, in a specific embodiment, the smart assistant may be configured to notify the backup administrator (e.g., NetWorker administrator) of all changes from the previous scan. All changes, including file-system changes, database changes, and network setting changes, from previous scan will be listed, categorized, and notified to the NetWorker administrator. The administrator can review the changes, and understand what has been changed from the scanned clients. In other words, in this specific embodiment, all changes that are detected will result in a notification to the administrator. Appropriate actions will be suggested when possible.

In a specific embodiment, a flag (e.g., a NetWorker resource flag) can be implemented to block specific clients from the periodic smart assistant scan. For example, the smart assistant may store a list of client IP addresses where clients listed in the list are not to be scanned. It may be desirable to block a scan for reasons related to corporate security policies. For example, some clients may be designated as high-security clients in which certain backup administrators may be restricted from knowing what changes occur on such clients. As another example, a backup administrator may block a scan in order to conserve the computing resources of a particular client. For example, the client may be a web server that requires a certain amount of network bandwidth in order to properly respond to requests for web pages. Depending on factors such as the computing resources available to the web server, expected network traffic, and so forth, it may not be desirable to repeatedly scan and ping such a server.

FIG. 32 shows an example of detecting network settings or interfaces configured on a client. FIG. 33 shows an example of detecting and listing fibre channel interfaces on a client. In some cases, it can be desirable to perform the backups over a fibre channel interface in order to reduce network traffic on the IP network. Thus, upon detecting that a client includes a fibre channel interface, the smart assistant may seek permission from the backup administrator to use the fibre channel interface for the backup.

In a specific embodiment, a method includes determining that a client currently being backed up via an IP protocol comprises a fibre channel interface, seeking permission from the administrator to user the fibre channel interface for the backup, receiving permission, and upon receiving the permission, updating the backup configuration information to indicate that the backup of the client is to be via the fibre channel interface.

FIG. 34 shows another NetWorker client detection example for a NetWorker client resource. FIG. 35 a client certificate detection example for NSR (NetWorker Save and Recover) peer information.

Figure 36:
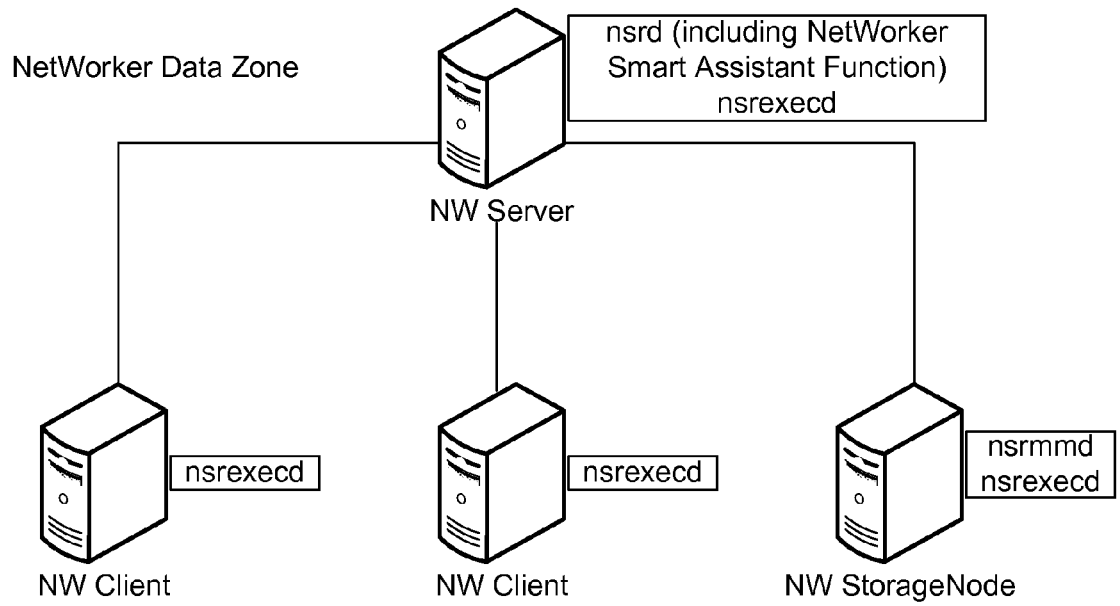
FIG. 36 shows an architecture where a smart assistant is integrated with another server daemon in a specific embodiment.
Figure 37:
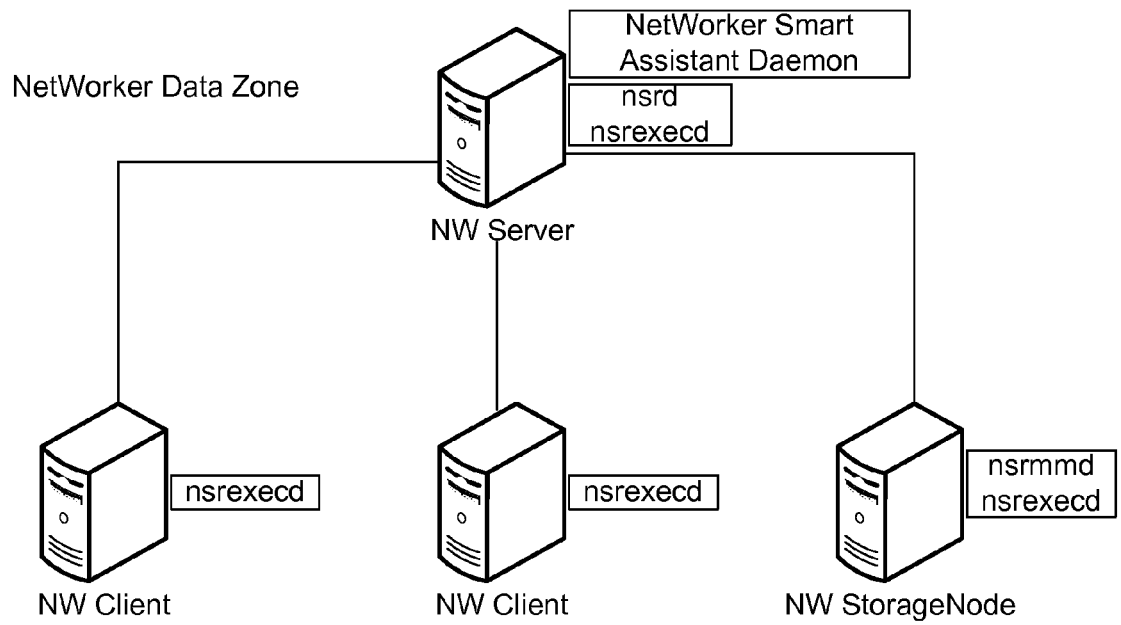
FIG. 37 shows an architecture where a smart assistant daemon co-exists with a server daemon on a backup server but is deployed as a separate daemon in another specific embodiment.
Figure 38:
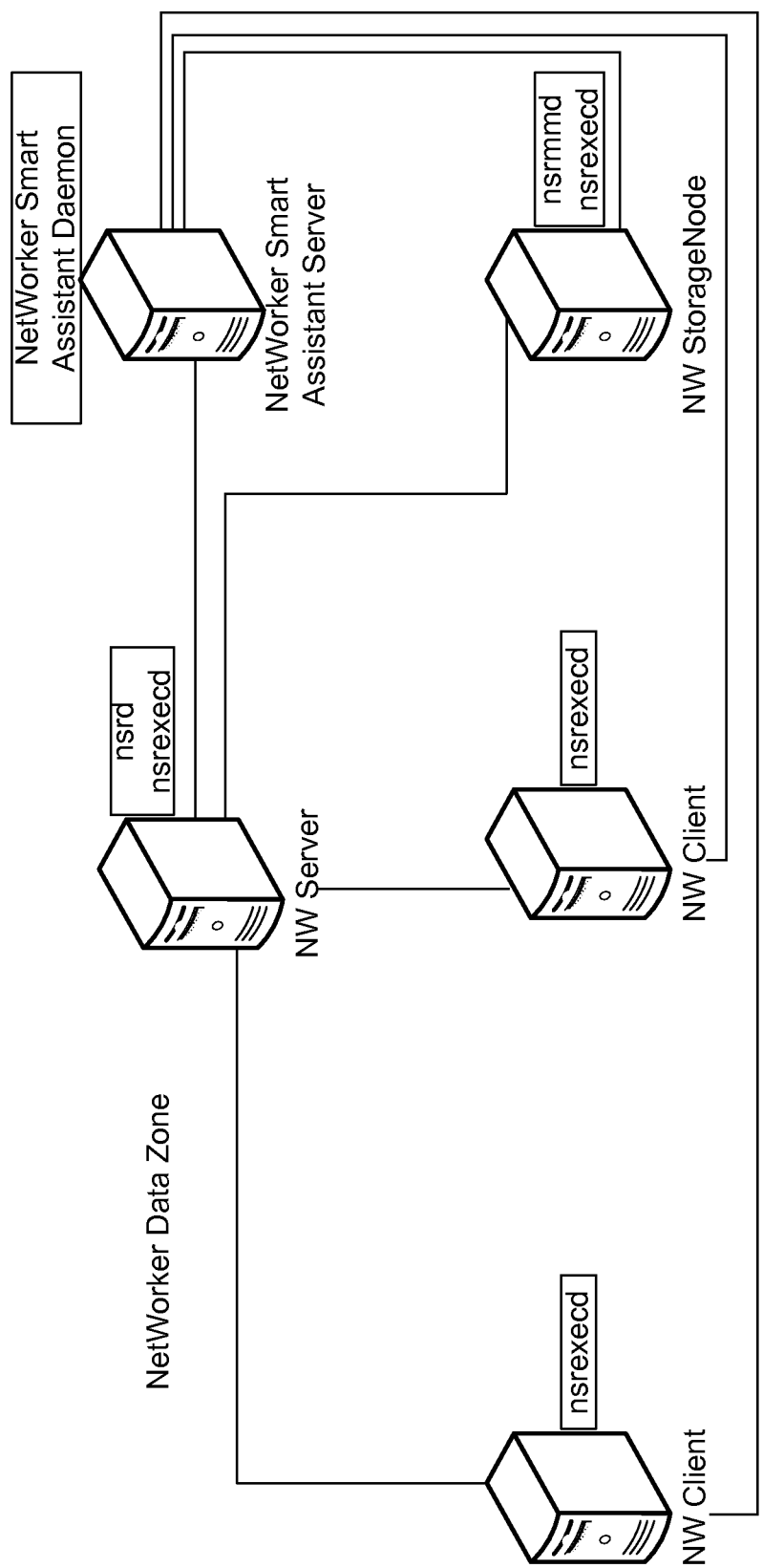
FIG. 38 shows an architecture where a smart assistant daemon is located outside of a backup server within a data zone in another specific embodiment.

FIGS. 36-38 show some options for the implementation and deployment of the smart assistant within the NetWorker data zone. FIG. 36 shows a first option in which the smart assistant is integrated with the nsrd daemon. FIG. 37 shows a second option in which the smart assistant is deployed as a new separate daemon that can co-exist on the NetWorker server. FIG. 38 shows a third option in which the smart assistant daemon is located outside of the NetWorker server within the data zone. In some cases, it is not desirable to overload nsrd. Thus, the smart assistant can be created as a separated daemon with lower priorities than other NetWorker daemons, so that it will not interfere with other high priority tasks. In this scenario the second and third options may be considered.

In a specific embodiment, a method includes scanning, by a computer-implemented backup assistant, a network, and a plurality of client computers connected to the network to obtain first information, scanning, by the computer-implemented backup assistant, the network, and at least a subset of the plurality of client computers connected to the network to obtain second information, comparing the second information against the first information to detect a change between the second and first information, upon detecting the change, seeking approval from a backup administrator to update backup configuration information based on the change, receiving approval from the backup administrator, and in response to the approval, automatically updating the backup configuration information for the backup server to backup the at least a subset of client computers to a backup storage node.

In another specific embodiment, there is a system for configuring backup configuration information, the system comprising a processor-based system executed on a computer system and configured to scan, by a computer-implemented backup assistant, a network, and a plurality of client computers connected to the network to obtain first information, scan, by the computer-implemented backup assistant, the network, and at least a subset of the plurality of client computers connected to the network to obtain second information, compare the second information against the first information to detect a change between the second and first information, upon detection of the change, seek approval from a backup administrator to update backup configuration information based on the change, receive approval from the backup administrator, and in response to the approval, automatically update the backup configuration information for the backup server to backup the at least a subset of client computers to a backup storage node.

In another specific embodiment, there is a computer program product, comprising a non-transitory computer-readable medium having a computer-readable program code embodied therein, the computer-readable program code adapted to be executed by one or more processors to implement a method comprising scanning, by a computer-implemented backup assistant, a network, and a plurality of client computers connected to the network to obtain first information, scanning, by the computer-implemented backup assistant, the network, and at least a subset of the plurality of client computers connected to the network to obtain second information, comparing the second information against the first information to detect a change between the second and first information, upon detecting the change, seeking approval from a backup administrator to update backup configuration information based on the change, receiving approval from the backup administrator, and in response to the approval, automatically updating the backup configuration information for the backup server to backup the at least a subset of client computers to a backup storage node.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
    scanning, by a computer-implemented backup assistant, a network, and a plurality of client computers connected to the network to obtain first configuration information specifying a configuration of the plurality of client computers as of a first time;
    scanning, by the computer-implemented backup assistant, the network, and at least a subset of the plurality of client computers connected to the network to obtain second configuration information specifying a configuration of the at least a subset of the plurality of client computers as of a second time, after the first time;
    comparing the second configuration information against the first configuration information to detect a change in configuration between the second and first configuration information;
    upon detecting the configuration change, seeking approval from a backup administrator to update backup configuration information based on the configuration change, the configuration change comprising a new source path identifying a new source to be backed up;
    receiving approval from the backup administrator; and
    in response to the approval, adding to a backup configuration table storing the backup configuration information the new source path identifying the new source to automatically update the backup configuration information for a backup server to backup the new source to a backup storage node,
    wherein the new source path is listed in the second configuration information and is not listed in the first configuration information.

2. The method of claim 1 wherein the comparing comprises determining that a client computer in the subset includes a partition listed in the second configuration information that is not listed in the first configuration information, and
    wherein the automatically updating the backup configuration information comprises adding, by the computer-implemented backup assistant, the partition to the backup configuration information.

3. The method of claim 1 wherein the comparing comprises determining that a client computer in the subset includes a database listed in the second configuration information that is not listed in the first configuration information, and
    wherein the automatically updating the backup configuration information comprises adding, by the computer-implemented backup assistant, the database to the backup configuration information.

4. The method of claim 1 comprising in response to the approval, installing a software module onto a client computer of the subset to backup the client computer to the backup storage node.

5. The method of claim 1 wherein the comparing comprises determining that the first configuration information lists a client computer of the subset as having a first version of a database, and the second configuration information lists the client computer as having a second version of the database, later than the first version, and
    wherein the automatically updating the backup configuration information comprises adding, by the computer-implemented backup assistant, a parameter to the backup configuration information, wherein the parameter is associated with the second version of the database, and is not associated with the first version of the database.

6. The method of claim 1 wherein the comparing comprises determining that a client computer of the subset includes a software module listed in the second configuration information that is not listed in the first configuration information, wherein the presence of the software module indicates that the client computer is not part of a data zone of client computers that are backed up by the backup server to the backup storage node, and
    wherein the automatically updating the backup configuration information comprises adding, by the computer-implemented backup assistant, the client computer to the backup configuration information.

7. The method of claim 1 wherein the comparing comprises determining that a client computer of the subset includes a fibre channel interface listed in the second configuration information that is not listed in the first configuration information, and
    wherein the automatically updating the backup configuration information comprises adding a parameter to the backup configuration information, wherein the parameter indicates that the fibre channel interface of the client computer is to be used to backup data from the client computer to the backup storage node.

8. The method of claim 1 wherein the comparing comprises determining that a client computer listed in the second configuration information is not listed in the first configuration information, the client computer thereby being a new client computer, and
    wherein the automatically updating the backup configuration information comprises adding the new client computer to the backup configuration information.

9. A system for configuring backup configuration information, the system comprising:
    a processor-based system executed on a computer system and configured to:
    perform a first backup of a plurality of client computers connected to a network;
    after the first backup, scan, by a computer-implemented backup assistant, the network, and the plurality of client computers connected to the network to obtain first configuration information specifying a configuration of the plurality of client computers as of a first time;
    after the scan to obtain first configuration information and before a second backup, scan, by the computer-implemented backup assistant, the network, and at least a subset of the plurality of client computers connected to the network to obtain second configuration information specifying a configuration of the at least a subset of the plurality of client computers as of a second time, after the first time;

compare the second configuration information against the first configuration information to detect a change in configuration between the second and first configuration information;

upon detection of the configuration change, seek approval from a backup administrator to update backup configuration information based on the configuration change;

receive approval from the backup administrator; and in response to the approval, automatically update the backup configuration information for the backup server to backup the at least a subset of client computers to a backup storage node.

10. The system of claim 9 wherein a client computer in the subset includes a partition listed in the second configuration information that is not listed in the first configuration information, and wherein the processor-based system is configured to add, by the computer-implemented backup assistant, the partition to the backup configuration information.

11. The system of claim 9 wherein a client computer in the subset includes a database listed in the second configuration information that is not listed in the first configuration information, and wherein the processor-based system is configured to add, by the computer-implemented backup assistant, the database to the backup configuration information.

12. The system of claim 9 wherein in response to the approval, the processor-based system is configured to install a software module onto a client computer of the subset to backup the client computer to the backup storage node.

13. The system of claim 9 wherein the first configuration information lists a client computer of the subset as having a first version of a database, and the second information lists the client computer as having a second version of the database, later than the first version, and wherein the processor-based system is configured to add, by the computer-implemented backup assistant, a parameter to the backup configuration information, wherein the parameter is associated with the second version of the database, and is not associated with the first version of the database.

14. The system of claim 9 wherein a client computer of the subset includes a software module listed in the second configuration information that is not listed in the first configuration information, wherein the presence of the software module indicates that the client computer is not part of a data zone of client computers that are backed up by the backup server to the backup storage node, and wherein the processor-based system is configured to add, by the computer-implemented backup assistant, the client computer to the backup configuration information.

15. The system of claim 9 wherein a client computer of the subset includes a fibre channel interface listed in the second configuration information that is not listed in the first configuration information, and wherein the processor-based system is configured to add a parameter to the backup configuration information, wherein the parameter indicates that the fibre channel interface of the client computer is to be used to backup data from the client computer to the backup storage node.

16. The system of claim 9 wherein a client computer listed in the second configuration information is not listed in the first configuration information, the client computer thereby being a new client computer, and wherein the processor-based system is configured to add the new client computer to the backup configuration information.

17. A computer program product, comprising a non-transitory computer-readable medium having a computer-readable program code embodied therein, the computer-readable program code adapted to be executed by one or more processors to implement a method comprising:

scanning, by a computer-implemented backup assistant, a network, and a plurality of client computers connected to the network to obtain first configuration information specifying a configuration of the plurality of client computers as of a first time;

scanning, by the computer-implemented backup assistant, the network, and at least a subset of the plurality of client computers connected to the network to obtain second configuration information specifying a configuration of the at least a subset of the plurality of client computers as of a second time, after the first time;

comparing the second configuration information against the first configuration information to detect a change in configuration between the second and first configuration information;

upon detecting the configuration change, seeking approval from a backup administrator to update backup configuration information based on the configuration change, the configuration change comprising a new source path identifying a new source to be backed up;

receiving approval from the backup administrator; and in response to the approval, adding to a backup configuration table storing the backup configuration information the new source path identifying the new source to automatically update the backup configuration information for the backup server to backup the new source to a backup storage node, wherein the new source path is listed in the second configuration information and is not listed in the first configuration information.

18. The computer program product of claim 17 wherein the comparing comprises determining that a client computer in the subset includes a partition listed in the second configuration information that is not listed in the first configuration information, and wherein the automatically updating the backup configuration information comprises adding, by the computer-implemented backup assistant, the partition to the backup configuration information.

19. The computer program product of claim 17 wherein the comparing comprises determining that a client computer in the subset includes a database listed in the second configuration information that is not listed in the first configuration information, and wherein the automatically updating the backup configuration information comprises adding, by the computer-implemented backup assistant, the database to the backup configuration information.

20. The computer program product of claim 17 comprising in response to the approval, installing a software module onto a client computer of the subset to backup the client computer to the backup storage node.

* * * * *